Nov. 18, 1958     C. M. BOLSER     2,860,546
TRUCK MIRROR AND SUPPORTING MEANS THEREFOR
Filed Sept. 19, 1955     2 Sheets-Sheet 2
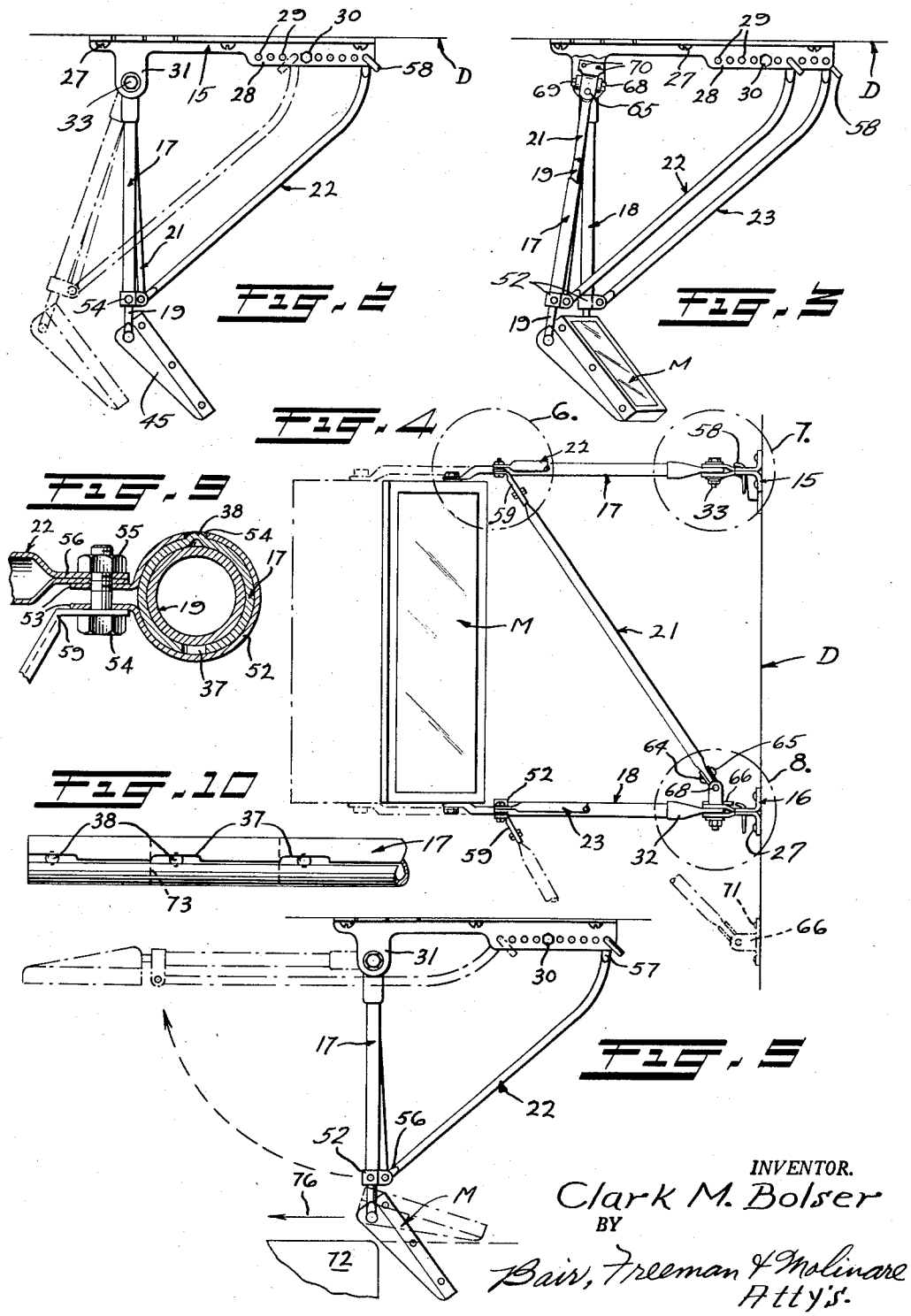
INVENTOR.
Clark M. Bolser
BY
Bair, Freeman & Molinare
Atty's.

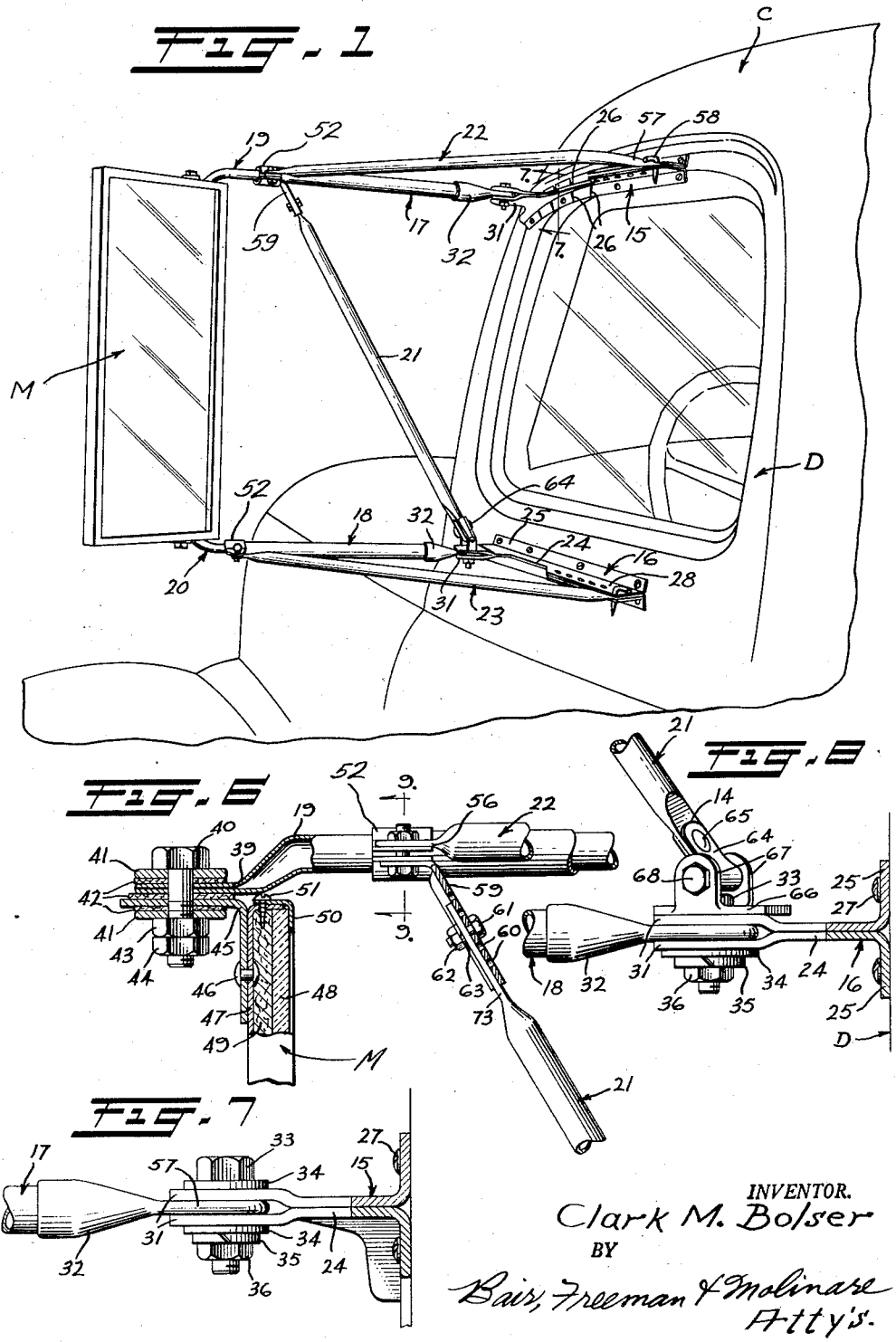

United States Patent Office 2,860,546
Patented Nov. 18, 1958

2,860,546

TRUCK MIRROR AND SUPPORTING MEANS THEREFOR

Clark M. Bolser, Cedar Falls, Iowa, assignor to Bolser Corporation, Cedar Falls, Iowa, a corporation of Iowa Application September 19, 1955, Serial No. 534,987

4 Claims. (Cl. 88—98)

This invention relates to a rear-view mirror and supporting means therefor with respect to the door or other suitable part of a truck cab or other vehicle.

One object of the invention is to provide mirror supporting means for mounting a mirror on a truck cab door, the means being universally adaptable for different sizes and shapes of doors, and readily adjusted so that the mirror can be properly directed with respect to the truck body or a semi-trailer or the like and readily fixed in the adjusted position.

Another object is to provide the mirror pivoted to the supporting means in such manner that if the mirror strikes an obstruction it will swing aside rather than being broken or the supporting means being broken or distorted.

Still another object is to provide a pivoted friction joint between the mirror and the supporting means, the joint being off-center relative to the vertical axis of the mirror and the mirror projecting outwardly from the pivot so that when the miror is struck by an obstruction, such as a passing truck, it can swing aside, and can also be manually swung aside if it is desirable to clear an obstruction such as a doorway of a garage or apparatus adjacent a greasing rack.

A further object is to provide mounting arms for the mirror which are pivoted to mounting brackets and are normally held in a predetermined position by arm braces pivoted to the arms and connected by readily disconnectible means to the brackets whereby such means may be disconnected and the the arms swung back against the side of the cab when desired, as when entering a relatively narrow greasing rack.

Still a further object is to provide mirror supporting arms which are formed of primary and secondary arms telescoped together so that the mirror can be located various distances from the truck cab door depending on the width of the truck body or semi-trailer body in relation to the width of the truck, readily clamped means being provided to hold the adjustment as desired.

An additional object is to provide the primary arm of special construction so that it can be cut off at different unit lengths and clamp permitting slots thereof will be effective at any lengths to permit a clamp to function for holding the telescopic adjustment of the secondary arm relative to the primary arm, means being provided at such cut-off station to coact with the clamp to hold it in a fixed position longitudinally of the primary arm.

Another additional object is to provide individual adjustments for upper and lower mirror mounting arms so that the mirror can be tilted for viewing upwardly or downwardly as desired in relation to a line parallel to the ground, thereby permitting the adjustment of the mirror for maximum vision range of the driver of the truck.

A further additional object is to provide a strut for bracing the mirror supporting arms, and which may be installed in different positions as desired to accomplish its function of bracing the entire mirror supporting means against upward or downward movement in relation to the truck body.

With these and other objects in view, my invention consists in the construction, arrangement and combination of the various parts of my truck mirror and its supporting means, whereby the objects above contemplated are attained, as hereinafter more fully set forth, pointed out in my claims and illustrated in detail on the accompanying drawings, wherein:

Fig. 1 is a perspective view of a truck mirror and supporting means therefor embodying my invention, showing them mounted on a truck cab door.

Fig. 2 is a plan view of the mirror and supporting means showing by dot-and-dash lines the possibility of adjusting the mirror to a position further ahead.

Fig. 3 is a similar plan view showing the possibility of adjusting the lower end of the mirror to a further rearward position than the upper end thereof in order to elevate the line of sight reflected from the mirror.

Fig. 4 is a rear elevation of the truck mirror and supporting means;

Fig. 5 is a plan view thereof similar to Fig. 2 showing the action when striking an obstruction and showing the possibility by dot-and-dash lines of folding the mirror and supporting means against the cab for entering a grease rack or the like;

Figs. 6, 7 and 7 are enlarged elevations, partly in section, of the portions of Fig. 4 shown within the circles 6, 7 and 8, respectively;

Fig. 9 is an enlarged sectional view on the line 9—9 of Fig. 6 showing a clamping means for the telescopically mounted arms of the mirror; and Fig. 10 is a bottom plan view of the primary arm showing special constructional features thereof.

On the accompanying drawings I have used the reference numeral 15 to indicate in general an upper mounting bracket and 16 a lower mounting bracket. An upper primary arm 17 and a lower primary arm 18 extend therefrom, and telescopically mounted in these arms are upper and lower secondary arms 19 and 20 for supporting a mirror shown generally at M. To brace the upper and lower arms, I provide upper and lower arm braces shown generally at 22 and 23 and a strut 21.

As to the specific construction of the foregoing described elements, the upper and lower mounting brackets each consists of a pair of angle-shaped stampings arranged back to back to form a web 24 of double thickness and spot welded together, with diverging flanges 25 for mounting the mounting brackets on the truck door D as by means of sheet metal-piercing screws 27. If the top rail of the door is curved as shown in Fig. 1, the upper mounting bracket may be curved to fit it and I provide for this by means of notches 26 cut into the flanges 25, thus permitting bending of the upper mounting bracket in the vertical plane. This bracket may be bent to fit the curvature of the door, whereas if the top rail is straight, no bending is required. The bracket, being made of sheet metal, can be readily bent by hand, or with the aid of a wrench or vise.

After the bracket is properly fitted, it is screwed to the top rail by marking the positions for the screw holes and then drilling into the sheet metal of the door D with the proper size drill for the self-tapping screws 27 to be inserted and tightened. The lower mounting bracket 16 is mounted in a similar manner.

Each bracket 15 and 16 is provided with elongated attachment flanges 28 for the arm braces 22 and 23 as will hereinafter appear, and these provide attachment flanges of bifurcated character. A series of spaced holes 29 are provided in the attachment flanges 28 and a bolt 30 may be located in one pair of the holes to prevent undesirable spreading of the attachment flanges.

At the forward end of each mounting bracket 15 and 16, is a pair of pivot ears 31 of bifurcated character as illustrated in Fig. 7. These are adapted to receive between them pivot fittings 32 after which bolts 33, washers 34, lock washers 35, and nuts 36 are assembled as shown in Fig. 7 for mounting the pivot fittings 32 of the primary arms 17 and 18 in a pivotal manner relative to the pivot ears 31.

When the upper mounting bracket 15 is curved to fit the upper rail of the door as above described, the primary arm 17 will slant forwardly and downwardly and this can be remedied by bending it up to a level position which puts a twist in the pivot ears 31 as shown in Fig. 7 for the proper association of the upper primary arms 17 with the rest of the assembly, as will hereinafter appear.

Referring to Fig. 10, the primary arms 17 and 18 are of special construction, each being made of a strip of sheet metal formed into a tube and desirably having the split on the lower side for water drainage purposes. The split is characterized by a series of clamp-permitting notches 37 opposite which are clamp locating projections 38. The purpose of the notches and projections will be described later.

In Fig. 6 I show a pivot ear 39 and these ears are provided at the outer ends of both the upper and lower secondary arms 19 and 20. The pivot ear 39 is pivotally associated with an angle bracket 45 by means of a bolt 40, a pair of washers 41, three friction washers 42 of fibre or the like, a nut 43 and a lock nut 44.

The angle bracket 45 is for mounting the mirror M on the arms 19 and 20 and is riveted as indicated at 46 to a pan-like mirror frame 47. The glass of the mirror is shown at 48 and suitable fibrous backing 49 is interposed between the back of it and the pair of frames 47. A mirror retaining frame 50 of angle cross section holds the mirror in position against the backing by means of sheet metal-piercing screws 51 through the peripheral flanges of the frame 50 and threaded into the frame 47. This construction facilitates the replacement of the mirror when broken.

Referring to Fig. 9, a clamp band 52 is shown having ears 53. A clamp bolt 54 extends through the ears and is provided with a nut 55. Above the upper ear a forward pivot ear 56 of the upper arm brace 22 is located and an upper strut pivot fitting 59 is located below the lower ear 53. When the nut 55 is tightened, the clamp band 59 contracts the diameter of the primary arm 17 in relation to the secondary arm 19, thus holding the two in telescopically fixed position. The notch 37 permits of this contraction of the arm 17, and the clamp band 52 is provided with an opening 54 receiving the projection 38 to locate the clamp against rotation and against sliding longitudinally of the tubular arm 17.

The upper and lower arm braces 22 and 23 have forward and rearward pivot ears 56 and 57, 56 being associated with the clamp bolt 54 and the nut 55 as already described, and 57 being located between the bifurcated attachment flanges 28 and held in position by angle pins 58 which are tapered for a force fit in the desired spaced openings 29 of the flanges. The angle pins can be removed and the mirror mounting arms 17, 18, 19, and 20 adjusted forwardly or rearwardly as desired, for instance from the solid line position to a forward dot-and-dash line position shown in Fig. 2. Also, the upper arms may be adjusted to a different position than the lower arms as shown in Fig. 3 to tilt the mirror out of a vertical plane transverse to the truck cab for raising or lowering the line of sight relative to the normal level position as desired by the driver.

The upper pivot fitting 59 for the strut 21 is provided with a plurality of spaced holes 60 for a bolt 61 to clamp the upper end of the strut thereto, which is flattened as indicated at 73, by means of a nut 62 and a lock washer 63 as shown in Fig. 6. The lower end of the strut is provided with a pivot fitting 64 riveted as indicated at 65 to a flattened lower end 74 of the strut as shown in Fig. 8. The fitting 64 surrounds a bolt 68 extending through ears 67 of a mounting bracket 66. This bracket is secured to the lower mounting bracket 16 by a bolt 33, a nut 36, a washer 34 and a lock washer 35.

The bracket 66 is provided with three holes 70 as shown in Fig. 3 and this bracket may be secured to the door D by screws 71, as shown by dotted lines in Fig. 4 with the pivot fitting 59 connected to the lower clamp band 52 rather than the upper one if it is desirable to have the strut 21 located below the entire installation rather than extending from the lower mounting bracket 16 up to the upper clamp band 52 as shown by solid lines in Fig. 4. The location of the strut is optional and provides a triangular support which is very rigid.

My mirror and its supporting means may be readily installed by the average individual with the use of a screwdriver, a drill and a few small wrenches. After it is assembled and mounted on the cab of the truck, it can be adjusted as desired to suit the driver. The mirror can be adjusted to right angles from the cab or adjusted forward or rearward. Road-adjustability is fully universal to give a wide range of road vision. The telescopic mounting of the secondary arms 19 and 20 in relation to the primary arms 17 and 18 permits a wide range of adjustment toward and away from the side of the cab.

By providing the construction shown in Fig. 10, coupled with the type of clamp band 52 shown in Fig. 9, it is unnecessary for the dealer to carry more than one size of supporting means in stock. The primary arms can be readily cut at the dotted lines indicated 73 in Fig. 10 and the inner ends of the arms 19 and 20 can be cut off as desired. The clamp band 52 can then be located on the appropriate projection 38 and the adjacent notch 37 will permit contraction of the primary arm around the secondary arm for fixing the telescopic adjustment when the clamp band is tightened at the bolt 54 and nut 55 as required. Also the parts are so designed that they can be turned over for right-side mounting instead of left-side mounting as illustrated on the drawings. Other adjustments already referred to can likewise be made with comparative ease.

The relatively large dimension vertically of the mirror offers maximum rear view vision. It will be noted that the pivot bolts 40 for the mirror are off center in relation to the mirror (see Figs. 2 and 5); so that when an obstruction 72 is met with (the direction of travel of the truck being indicated by the arrow 76) the mirror will merely be swung back to the dash line position illustrated instead of being broken. The frictional pivot connection shown in Fig. 6 permits this and may be adjusted to the desired tightness by means of the nuts 43 and the adjustment thereafter retained by the lock nuts 44. After the obseruction 72 is passed, the mirror may be manually swung back to the desired position with a minimum of effort and time.

The angle pins 58, being readily removable, permit the adjustment to the dot-and-dash line position shown in Fig. 5 when desired and also permit the adjustments illustrated in Figs. 2 and 3. Since the angle pins are tapered, they remain in position after being inserted without the necessity of applying nuts or other retaining means to them.

Some changes may be made in the construction and arrangement of the parts of my truck mirror and supporting means therefor without departing from the real spirit and purpose of my invention. It is therefore my intention to cover by my claims such modified forms of structure or use of mechanical equivalents as may reasonably be included within their scope.

I claim as my invention:

1. A mirror for trucks and the like and means for mounting the mirror on the truck comprising upper and lower elongated mounting brackets, upper and lower arms pivoted to the forward ends of said brackets and extending laterally from the truck, said mirror being pivoted to the outer ends of said arms, and upper and lower braces pivoted to said arms and extending toward the rear ends of said mounting bracket, said rear ends having a series of spaced openings therein, the rear ends of said arm braces having openings therein, and readily removable pins for connecting said rear ends of said braces selectively to the openings of said brackets by said pins being received in said openings for adjusting the angles between said arms and said brackets.

2. A mirror and means for mounting the mirror on a truck comprising upper and lower elongated mounting brackets, upper and lower arms pivoted to the forward ends of said brackets and extending laterally from the truck, said mirror being pivoted to the outer ends of said arms on an axis adjacent the inner edge of the mirror, braces pivoted to said arms and extending toward the rear ends of said mounting brackets, said rear ends having a series of spaced openings therein, and the rear ends of said arm braces being selectively connected with said openings for adjusting said arms pivotally relative to said openings for adjusting said arms pivotally relative to said brackets, said arms being of two-part telescoping construction and the connections of said braces thereto including clamp bands for holding the telescopic adjustment of parts of said arms relative to each other.

3. A mirror for trucks and the like and means for mounting the mirror on a truck comprising upper and lower elongated mounting brackets, upper and lower arms pivoted to the forward ends of said brackets and extending laterally from the truck, said mirror being pivoted to the outer ends of said arms, on an axis adjacent the inner edge of the mirror, upper and lower braces pivoted to said arms and extending toward the rear ends of said mounting brackets, said rear ends having a series of spaced openings therein, and the rear ends of said arm braces being selectively connected with said openings for adjusting the angles between said arms and said brackets.

4. A mirror and means for mounting the mirror on a vehicle comprising upper and lower elongated mounting brackets, upper and lower arms pivoted to the forward ends of said brackets and extending laterally from the vehicle, said mirror being pivoted to the outer ends of said arms, braces pivoted to said arms and extending toward the rear ends of said mounting brackets, said rear ends having a series of spaced openings therein, the rear ends of said arm braces being selectively connected with said openings for adjusting said arms pivotally relative to said brackets, said arms being of two-part telescoping construction, the connections of said braces thereto including clamp bands for holding the telescopic adjustment of the two-parts of said arms relative to each other, a strut for said mounting means extending from adjacent the outer end of one of said arms toward the vehicle and connected thereto to provide triangular bracing means for the arms, said strut having a bracket on its lower end which may be connected with the vehicle.

References Cited in the file of this patent

UNITED STATES PATENTS

| | | |
|---|---|---|
| 742,687 | Livingston | Oct. 27, 1903 |
| 1,828,804 | Horton | Oct. 27, 1931 |
| 1,932,483 | Ritz-Woller | Oct. 31, 1933 |
| 2,458,117 | Tolbert | Jan. 4, 1949 |
| 2,552,074 | Thompson | May 8, 1951 |
| 2,708,086 | Prutzman | May 10, 1955 |
| 2,751,817 | Lapekas | June 26, 1956 |